United States Patent [19]

Sato et al.

[11] 3,920,605

[45] Nov. 18, 1975

[54] METAL-CONTAINING ORGANIC HIGH MOLECULAR COMPOUND REINFORCED WITH PARTICULATE ORGANIC OR INORGANIC MATERIAL

[75] Inventors: Hiroshi Sato; Koji Takahashi; Sadaaki Shigeta; Yoshitaka Abe, all of Ohtake, Japan

[73] Assignee: Mitsubishi Rayon Co., Ltd., Tokyo, Japan

[22] Filed: Aug. 27, 1974

[21] Appl. No.: 500,924

Related U.S. Application Data

[63] Continuation-in-part of Ser. No. 328,150, Jan. 30, 1973, abandoned, which is a continuation-in-part of Ser. No. 211,661, Dec. 23, 1971, Pat. No. 3,840,505.

[30] Foreign Application Priority Data

Dec. 24, 1970 Japan.............................. 45-117283

[52] U.S. Cl. ....... 260/42.17; 260/42.18; 260/42.22; 260/42.24; 260/42.29; 260/85.5 R; 260/85.5 ES; 260/85.5 AM; 260/85.5 S; 260/85.5 M; 260/898

[51] Int. Cl.²... C08K 3/08; C08K 3/34; C08K 7/04; C08K 7/14

[58] Field of Search............ 260/42.17, 42.18, 42.22, 260/42.24, 42.29, 85.5 ES, 85.5 AM, 85.5 R, 85.5 S, 85.5 M, 898

[56] References Cited
UNITED STATES PATENTS

| | | | |
|---|---|---|---|
| 2,356,767 | 8/1944 | Kropa................................ | 260/85.5 |
| 2,425,191 | 8/1947 | Kropa............................ | 260/85.5 ES |
| 2,648,647 | 8/1953 | Stanton......................... | 260/85.5 ES |
| 3,717,603 | 2/1973 | Matsumura................... | 260/85.5 ES |

*Primary Examiner*—James H. Derrington
*Attorney, Agent, or Firm*—Oblon, Fisher, Spivak, McClelland & Maier

[57] ABSTRACT

A filler-reinforced, metal-containing, organic high molecular compound is formed from: (1) 100 parts by weight of a copolymer of 45–97% by weight of at least one member selected from the group consisting of acrylonitrile and methacrylonitrile and 55 – 3% by weight of at least one member selected from the group consisting of unsaturated carboxylic ester, unsaturated carboxylic acid and unsaturated carboxylic amide of which are copolymerizable with said acrylonitrile or methacrylonitrile, which copolymer is stabilized through cross-linking with at least one metallic compound of a transition metal of the 4th Period of the Periodic Table, a metal of Group II of the Periodic Table or a mixture thereof, said metal being in ion or salt form and being coordination bonded with the nitrile groups of the copolymer in molar ratios of from 1 : 32 to 32 : 32, and (2) 0.5 – 9000 parts by weight of at least one inorganic or organic filler dispersed in the metal-containing, organic high molecular compound.

8 Claims, No Drawings

METAL-CONTAINING ORGANIC HIGH MOLECULAR COMPOUND REINFORCED WITH PARTICULATE ORGANIC OR INORGANIC MATERIAL

CROSS REFERENCE TO RELATED APPLICATION

This application is a Continuation-in-Part of application Ser. No. 328,150, filed Jan. 30, 1973, now abandoned which is a Continuation-in-Part of copending application Ser. No. 211,661, filed Dec. 23, 1971, now U.S. Pat. No. 3,840,505.

BACKGROUND OF THE INVENTION

1. Field of the Invention

This invention relates generally to filler reinforced coordination bonded metal compounds containing acrylonitrile and/or methacrylonitrile copolymers. More particularly, this invention relates to a filler reinforced coordination bonded metal compound containing acrylonitrile and/or methacrylonitrile copolymers wherein the metal compound is coordination bonded through the nitrile units of said copolymer. Optionally, at least one particulate or fibrous filler is dispersed throughout said compound.

2. Description of the Prior Art

It is known that the properties of organic high molecular weight compounds can be varied by bonding metals to the molecule. Such materials have found a wide range of industrial acceptability, particularly as molding, structural and industrial materials. Bonding of the metal to the organic compound is attained by the formation of ionic or coordination bonds.

In ionic bonding, the metals are typically ionically bonded to an ionic group in the high molecular weight compound, typically a carboxylic acid group. Such ionically bonded compounds are characterized, in the solid state, by a high degree of impact resistance, good rubber elasticity and good flexibility, as comparable to conventional cross-linked polymeric compounds. The ionically bonded, metal containing organic high molecular weight compounds, however, tend to lose their structural stability when placed into polar solvents, such as water or alcohol, or in an atmosphere of the polar solvents, particularly at high temperatures. These compounds also demonstrate the deleterious effects that they tend to lose their structural stability when subjected to shearing stresses at high temperatures, which tend to break the ionic bonds and create unacceptably high fluidity.

Coordination bonded, metal containing high molecular weight compounds are considerably superior to the corresponding ionically bonded compounds insofar as such characteristics as heat resistance and structural stability and the like are concerned, particularly when subjected to the action of polar solvents. In view of these desirable properties, it has been proposed to prepare metal coordination compounds of nitrile group containing vinyl polymers, wherein the coordination bonding is through the nitrile groups. These compounds are relatively easy to obtain in the form of relatively high molecular weight compounds, as compared with conventional, coordination bonded, metal containing organic high molecular weight compounds, and could be expected to find specific utility as structural materials of excellent thermal and mechanical properties. However, nitrile group containing vinyl polymers, such as polyacrylonitrile will thermally or oxidatively decompose when exposed to temperatures of above 250°C. When atoms or ions of metals, particularly those of the transition metals, are present in the polyacrylonitrile, the rate of oxidative decomposition is accelerated, and in some instances can begin to occur at temperatures as low as about 180°C. Coordination bonding of the metal compound with the acrylonitrile polymer had to be effected under relatively mild conditions.

The softening point of polyacrylonitrile is about 300°C, and it will thermally decompose, oxidatively decompose and change color when heated to that temperature, so that it is difficult to successfully mold. This has also severely hindered the full acceptance of metal containing acrylonitrile polymers for use as structural materials.

A need exists, therefore, for a metal containing organic high molecular weight compound which possesses good mechanical properties including good heat resistance, high modulus of elasticity, high tensile strength and good flexural strength.

SUMMARY OF THE INVENTION

Accordingly, it is one object of this invention to provide a metal containing organic high molecular weight compound which is characterized by excellent structural stability at high temperatures, and by good processability.

Another object of this invention is to provide a process for preparing these novel compounds.

These and other objects, as will hereinafter become more readily apparent, can be attained by the provision of a filler reinforced metal-containing polymeric compound formed from: (1) 100 parts by weight of a copolymer of 45–97% by weight of at least one member selected from the group consisting of acrylonitrile and methacrylonitrile, and 55 – 3% by weight of at least one member selected from the group consisting of unsaturated carboxylic ester, unsaturated carboxylic acid and unsaturated carboxylic amide each of which is copolymerizable with said acrylonitrile or methacrylonitrile, which copolymer is stabilized through cross-linking with at leaast one metallic compound of a transition metal of the 4th Period of the Periodic Table, a metal of Group II of the Periodic Table or a mixture thereof, said metal being in ion or salt form and being coordination bonded with the nitrile groups of the copolymer in molar ratios of from 1 : 32 to 32 : 32, and (2) 0.5 – 9000 parts by weight of at least one inorganic or organic filler dispersed in the metal-containing, organic high molecular compound.

DETAILED DESCRIPTION OF THE INVENTION

The process for preparing the compounds of this invention comprises the steps of (1) dispersing or dissolving in water or a polar solvent about 45 – 97% by weight of acrylonitrile and/or methacrylonitrile and about 55 – 3% by weight of an unsaturated carboxylic acid and/or its ester and/or amide, (2) polymerizing the suspension, emulsion or solution using a free radical polymerization initiator at temperatures of from 5°C. to 90°C. to produce a copolymer containing 45 – 97% by weight of the nitrile compound and 3 – 55% by weight of the unsaturated carboxylic compound. Alternatively, this compound can be prepared by (1') dispersing or dissolving about 45 – 97 parts by weight of acrylonitrile or methacrylonitrile and about 55–3 parts by weight of an unsaturated carboxylic compound in a sol of 0.5 – 9000 parts of a powdered inorganic or organic material, such as powdered silicon dioxide, in water or a polar solvent, the inorganic material forms a colloid in the sol, (2′) suspension or emulsion polymerizing the mixture using a free radical polymerization initiator at temperatures of from 5° to 90°C. to produce a copolymer containing 45 – 97 parts by weight of the nitrile compound and 3 – 55 parts by weight of the unsaturated carboxylic compound and having the powdered inorganic or organic material uniformly dispersed therein. In either instance, the copolymer may further have incorporated therein a particulate filler, such as powdered aluminum or copper, or a fibrous filler, such as asbestos fibers. The thus-produced copolymer is then reacted (3) with at least one metal compound of a 4th Period transition metal or a Group II metal in a molar ratio of from 1 : 32 to 32 : 32 metal compound to nitrile groups of the copolymer, while heating at a temperature of 150° – 250°C. either during or after compression molding at a pressure of at least 50 $Kg/cm^2$. An alternative method is to react the copolymer with the metallic compound at a temperature of 40° – 140°C. in a solution of a common solvent, or in suspension using a solvent for the metallic compound, removing the solvent from the reaction mixture to obtain a solid residue and then molding the residue to obtain a heat-resistant, metal-containing, organic high molecular compound wherein the nitrile groups are coordination bonded with the metallic ion or metallic compound in a molar ratio of from 32 : 1 to 32 : 32.

Suitable metallic compounds useable for these processes include the chlorides, carbonates, borates, acetates, sulphates, nitrates, or acetylacetonates or iron, cobalt, nickel, manganese or copper, as the transition metals, or of zinc, etc., as the Group II metals.

The metal-containing, organic high molecular compounds of this invention, in which the nitrile groups are coordination bonded with the ions or salts of said metals, have an increased structural stability at high temperatures, an increased modulus of elasticity and a decreased thermal expansibility owing to the formation of coordination bond type cross-linking structures in the molecule. If these compounds further contain a powdered inorganic material, they will be provided with very desirable properties as a reinforced polymeric material.

Suitable copolymers which may be used for the production of the metal-containing polymeric compound according to this invention are those which contain acrylonitrile or methacrylonitrile in amounts of 45 – 97% by weight. If the copolymer contains less than 45% by weight nitrile compounds, the product will not have satisfactory heat resistance when coordination bonded with said specific metallic compounds.

The unsaturated carboxylic compounds used in the formation of the copolymer may be a carboxylic acid, ester or amide.

Suitable unsaturated carboxylic esters include alkyl esters of acrylic, methacrylic, itaconic, fumaric, crotonic and maleic acids, wherein the alkyl group contains from 1 – 8 carbon atoms and is preferably methyl, ethyl, n-butyl or i-butyl. Suitable unsaturated carboxylic amides which may be used include acrylamide, methacrylamide, N-methylol acrylamide, N-methylol methacrylamide and diacetone acrylamide. Suitable unsaturated carboxylic acids which may be used include the acids of acrylic, methacrylic, itaconic, fumaric, crotonic, and maleic.

The copolymers prepared with the unsaturated carboxylic compounds and the acrylonitrile and/or methacrylonitrile are inhibited from thermal and oxidative decomposition and have low softening points, which enhance their moldability, as compared with polyacrylonitrile or polymethacrylonitrile.

It has been found that the extent of enhanced properties can be varied by the quantity of unsaturated carboxylic compound used, within the above-mentioned limits.

More particularly, if the copolymer contains the unsaturated carboxylic ester as one of the copolymerized components, it will significantly inhibit thermal and oxidative decomposition, as compared with polyacrylonitrile, so that it is relatively easy to select suitable conditions for a complex-forming reaction of the nitrile groups of the copolymers with the metallic compound. The resulting metal-containing polymeric compounds will thus be superior in fluidity and processability, such as moldability, because the copolymers have lower softening points. If the copolymers contain too much unsaturated carboxylic compounds, however, the structural stability at high temperatures can be impaired.

If the copolymers contain an unsaturated carboxylic amide as one of the copolymerized components, the resulting metal-containing organic high molecular compounds will be superior in such mechanical properties as tensile strength, impact strength and flexural strength, and will also be excellent in structural stability at high temperatures. Moreover, it will be characterized by good flame resistance.

If the copolymers contain an unsaturated carboxylic acid as one of the copolymerized components, the complex-forming reaction between the metallic compound and the copolymer can be effected under relatively mild conditions without decomposition or other difficulties. The thus-obtained metal-containing products will be characterized by excellent mechanical properties, including excellent tensile, flexural and impact strengths, and moreover, its structural stability will not decrease at high temperatures, as compared with comparable materials formed with polyacrylonitrile. It is believed that this excellence in properties is due to the fact that in a complex-forming reaction, the metallic ions are ionically captured by the carboxyl groups of the copolymers at an early stage of the reaction and the thus-produced ionic bonds are broken off during the subsequent heat treatment or heat compression molding stage, thereby effecting coordination bonding between the nitrile groups and metallic ions.

The unsaturated carboxylic compound used herein may be partially replaced with other copolymerizable monomers, such as the unsaturated aldehydes, including acrolein or methacroelin, the unsaturated halogenides, including vinyl chloride or vinylidene chloride, or vinyl acetate or styrene.

Suitable free-radical polymerization initiators used for forming the subject polymers, may include any conventional initiator used for this purpose, such as the peroxides, the diazo-compounds, the persulfates and the redox type catalysts.

As indicated above, in one of the embodiments of this invention, polymerization can be effected in a sol of a powdered inorganic material, in water, or a polar solvent whereby the inorganic material forms a colloid in the sol. Suitable such sols include those stable sols of powdered silica or alumina having a particle size of from 5 to 1,000 mμ, in a solvent such as water, methanol or other polar solvent.

As described before, the metal-containing, organic high molecular compounds of this invention consist of: (1) a copolymer prepared by copolymerizing acrylonitrile and/or methacrylonitrile with an unsaturated carboxylic compound, such as a carboxylic ester, amide, or acid, (2) coordination bonding a metallic compound to the nitrile groups of the copolymer in the form of a metallic ion or salt, and, if desired, (3) uniformly dispersing a powdered inorganic material in the copolymer.

The mechanism of the coordination bonding or complex-forming reaction, and the structure of the metal-containing, organic high molecular compounds are not completely understood at the present time. The compounds of this invention, however, were found to have a specific color tone depending upon the particular metal or metals and/or metal ion or ions contained in the copolymer, and these compounds are insoluble in boiling dimethylformamide. This surprisingly high thermal stability and greatly improved mechanical properties would indicate that these compounds are novel high molecular weight compounds which are different from any heretofore known.

It is believed that the metal-containing, organic high molecular compounds of this invention have the structure as shown below (number of coordination in this case being 4). (Refer to *Bull.Chem.Soc.Japan*, Vol. 32, p. 741.)

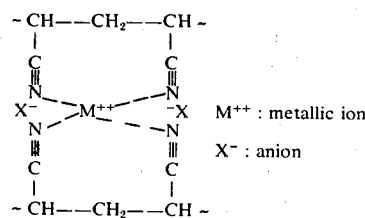

$M^{++}$ : metallic ion $X^-$ : anion

The extent of intermolecular and intramolecular cross-linkings through the metallic salts or ions, will depend upon the number of these coordination bonds available for cross-linking. If a molar ratio of nitrile groups to metallic ions or salts to which the groups are coordination bonded is too large, the desirable improvements in heat resistance, as previously mentioned, will not be obtained. On the other hand, if this molar ratio is too low, the fluidity and consequent moldability will be affected; for example, an acrylonitrile-methacrylic acid copolymer containing 10% by weight of methacrylic acid coordination bonded with copper borate which has been compression molded at 200°C. and 500 Kg/cm² for 15 minutes to obtain molded articles, heated in air at 300°C. for 5 minutes to determine weight loss. Ten parts by weight of this article was immersed in 990 parts by weight of boiling dimethylformamide at 153°C. for 8 hours to determine the quantity of dissolvable material contained in the article. The articles were further tested for flexural strength and fractures were determined by observation using a scanning type electron microscope to determine the degree of adhesion between the copolymer particles and the metallic compound and the degree of fluidity. The results obtained from these tests are shown in Tables 1A and 1B.

Table 1A.

| Variation of Effect of Metal with Amount Thereof used | | | | | |
|---|---|---|---|---|---|
| Amount of copper borate (calculated as metal) (Molar ratio of metal to nitrile group Cu/CN) | 0 | 1/128 | 1/64 | 1/32 | 1/8 |
| Amount of compound dissolved in boiling dimethylformamide(%) | 98.1 | 43.9 | 9.2 | 0.81 | 0.32 |
| Weight loss (%) (After heated in the air at 300°C for 5 minutes) | 34.5 | 22.5 | 12.0 | 5.0 | 3.0 |
| Flexural strength (Kg/cm²) | 1250 | 1210 | 1270 | 1130 | 1070 |
| Fluidity | No interparticulate boundaries found Good fluidity | The same as left | The same as left | The same as left | The same as left |

Table 1B.

| Variation of Effect of Metal with Amount Thereof used | | | | |
|---|---|---|---|---|
| Amount of copper borate (calculated as metal) (Cu/CN) | 1/4 | 1/1 | 1.5/1 | 2/1 |
| Amount of compound dissolved in boiling dimethylformamide (%) | 0.23 | 0.24 | 0.18 | 0.20 |
| Weight loss (%) (After heated in the air at 300°C for 5 minutes) | 2.5 | 1.1 | 0.9 | 0.9 |
| Flexural strength (Kg/cm²) | 920 | 880 | 420 | 390 |
| Fluidity | Independent particles seen locally | The same as left | Very many independent particles seen and interparticulate boundaries clearly found | The same as left |

As can be seen from Tables 1A and 1B, the metal-containing organic high molecular compound should have a molar ratio of 32 : 1 to 32 : 32 of the nitrile groups of the copolymer to the metallic ions or salts to obtain the desirable characteristic of this invention. If the molar ratios between the nitrile groups and the metallic ions or salts are below this range, the metal-containing compound will have fewer coordination bond type cross-linkages, thereby rendering the compound unsatisfactory from the point of view of heat resistance, etc. On the other hand, if the molar ratios exceed this range, the compound will have too many cross-linkages so that moldability and fluidity will be adversely affected.

The metallic ions or salts contained in the metal-containing, high molecular compounds of this invention product will be low in flexural strength and insufficient in high temperature structure stability. If this temperature is above 250°C., the copolymer will be thermally decomposed and/or oxidatively decomposed, thus also reducing the mechanical properties. For example, various moldings were obtained by incorporating samples of an acrylonitrile-methacrylic acid copolymer containing 10% by weight of methacrylic acid with copper borate in such amounts that one copper atom is present for every eight nitrile groups. The material was molded at different molding pressures and temperatures, respectively. The weight loss caused during the molding operations, which is an indication of decomposition, and the heat distortion temperatures and flexural strengths of the thus-obtained moldings are shown in Table 2.

TABLE 2

| | Effect of Molding Pressure and Temperature | | | | | | | | | | | |
|---|---|---|---|---|---|---|---|---|---|---|---|---|
| Molding pressure ($Kg/cm^2$) | 20 | 40 | 50 | 100 | 200 | 500 | 500 | 500 | 500 | 500 | 500 | 500 | 500 |
| Molding temperature (°C) | 200 | 200 | 200 | 200 | 200 | 120 | 140 | 150 | 180 | 200 | 240 | 250 | 270 |
| Molding time (min.) | 60 | 60 | 60 | 20 | 20 | 120 | 120 | 120 | 30 | 15 | 5 | 5 | 5 |
| Weight loss during molded (%) $\frac{\text{Weight after molded}}{\text{Weight before molded}} \times 100\%$ | 1.1 | 1.4 | 1.0 | 0.8 | 1.8 | 0.4 | 0.3 | 1.0 | 1.6 | 2.0 | 3.2 | 4.9 | 47.0 |
| Heat Distortion temp. (°C) (ASTM D648. Load 18.6 $Kg/cm^2$) | 90 | 101 | 171 | 191 | 216 | 90 | 108 | 180 | 194 | 200 | 214 | 220 | Impossible to measure because collapsed |
| Flexural strength ($Kg/cm^2$) | 65 | 230 | 830 | 890 | 1020 | 20 | 310 | 1320 | 1280 | 1100 | 1170 | 870 | Ditto | should be those which are capable of being coordination bonded to the nitrile groups contained in the same compounds. For this purpose, any ion or salt of a metal selected from the group of 4th Period transition metals or Group II metals of the Periodic Table of Elements, may be used. For instance, suitable chemical compounds usable include the organic or inorganic acid salts of iron, cobalt, nickel, manganese, copper and zinc, and they may preferably be the chlorides, carbonates, borates, acetates, sulphates, nitrates and acetylacetonates of these metals. These compounds may be used either singly or in admixtures of two or more. Unlike the prior art compounds, alkali metal ions are useless in the practice of this invention because they form no coordination bond with the nitrile groups.

According to one aspect of this invention, the coordination bond-forming reaction between the nitrile group containing copolymer and at least one of the metallic compounds is effected by admixture in a ball mill, or the like, and then heating at a temperature of 150°–250°C. either during or following compression molding at a pressure of at least 50 $Kg/cm^2$. The use of pressures of less than 50 $Kg/cm^2$ will generally be insufficient to effect the reaction between the copolymer particles and the metallic compounds, due to insufficient contact, and will result in a product of low tensile, flexural and impact strengths.

During the heat treatment the metal-containing organic compound of this invention, which can occur either during or following compression molding, a coordination bond type cross-linking reaction takes place, with aid of a metallic compound, between the copolymer particles contacted with or melt adhered to each other, so that a firm molded article is obtained. If the treating temperatures used in this step is less than 150°C, the coordination bond type cross-linking reaction will not completely occur so that the resulting According to another aspect of this invention, the complex formation is achieved by dissolving the nitrile group-containing copolymer and the metallic compound in a common solvent, heating the solution at temperatures of 40°–140°C., treating the solution to remove the solvent therefrom to obtain a solid material and then heating the solid material at temperatures of 150°–250°C. either during or following compression molding at pressures of at least 50 $Kg/cm^2$. A wide variety of solvents may be used for this purpose. However, good results are attainable with dimethylformamide dimethylacetoamide, dimethylsulfoxide, or an aqueous solution of potassium thiocyanide, sodium thiocyanide, calcium thiocyanide, ammonium thiocyanide, zinc chloride, ferric chloride, stannic chloride, or a zinc chloride-calcium chloride mixture.

According to still another aspect of this invention, the complex formation may also be achieved by suspending the nitrile group-containing copolymer in a solution of the metallic compound in water or other solvent, heating the suspension at temperatures of 40°–140°C., filtering the reaction mixture to collect a residue, drying the residue and then heating the dried residue to temperatures of 150°–250°C. during or following compression molding, at pressures of at least 50 $Kg/cm^2$.

In the latter two aspects of this invention, if the complex-forming reaction temperatures used are below 40°C., the reaction velocity will be significantly reduced thereby allowing the metallic ions to combine with the copolymer in sufficient proportions. On the other hand, if the temperatures used are above 140°C., a sufficiently secure, interparticulate adhesion in the complex will not be obtained during compression molding, thereby yielding moldings having degraded mechanical properties. This effect is believed to be due to the large proportion of nitrile groups which are coordination bonded with the metallic ions at temperatures of above 140°C., so that cross-linking does not occur in the heating step.

The metal-containing organic high molecular compound, reinforced by an inorganic or organic filler, obtained according to this invention, may have widely varied properties depending upon the intended use of the product. Nevertheless, it will retain its basic properties, such as its excellent thermal stability and its high mechanical strength characteristics. One control over the range of properties is obtained by appropriate selection of the type and amount of the inorganic or organic filler used in the matrix. When using a particular inorganic filler, such as copper, aluminum, iron or ferrous alloys, tin, zinc, nickel, silver, lead, bronze, brass, gun metal, stainless steel, graphite, boron nitride and molybdenum disulphide; fibrous materials such as carbon, stainless steel and copper fibers; and graphite and copper whiskers, a product will be obtained which is characterized by thermal and mechanical properties particularly improved structural stability at high temperatures, and improved thermal conductivity, thermal expansion and elastic modulus. Owing to the high thermal conductivity of the fillers contained in the product, heat created by the coordination bond-forming reaction between the metallic compound and the nitrile groups of the compound (copolymer) matrix, can be effectively released when the product is subjected to such heat processes as molding or post-molding. This will remarkably facilitate the molding of the product into thick articles and the heat treatment thereof during or after the molding without incurring decomposition of said product. The use of a filler, such as copper, aluminum, iron, zinc, nickel, bronze, brass, gun metal, silver, stainless steel or graphite, in the particulate form, or stainless steel or copper in fibrous form, or graphite or copper in the whisker form, will provide a product which has remarkably improved elasticity, high-temperature structural stability, heat conductivity, wear resistance and electric conductivity. The use of fibrous or whisker fillers will yield a product which has improved tensile and impact strengths in addition to the previously-mentioned improved properties. To attain such improvements, it is preferable to use particular copper, iron and ferrous alloy, zinc, nickel, bronze, brass, gun metal, silver or stainless steel; fibrous stainless steel or copper; or copper or tungsten whisker, each in amounts of at least 20 parts by weight per 100 parts by weight of copolymer. However the use of the filler in amounts exceeding 9000 parts by weight or more will undesirably decrease the mechanical properties of a product in which the filler is to be incorporated. Articles shaped from the filler-reinforced, metal-containing, organic high molecular weight compound containing at least 2000 parts of copper or its alloys, iron or its alloys, nickel, or the like, each in particulate form, per 100 parts by weight of copolymer matrix, may be heated in a reducing atmosphere by conventional metallurgical processes as is commonly used for powdered metal, to obtain a self-lubricating sinter of said metallic filler. Among said fillers, graphite, aluminum, molybdenum disulphide and boron nitride particles as well as carbon fibers, graphite whiskers and the like should preferably be incorporated in amounts of 5 – 2000 parts by weight per 100 parts by weight of copolymer matrix. The use of these fillers in amounts of more than 2000 parts by weight will cause a decrease in mechanical strength in the resulting product. The particulate fillers are usually 150$\mu$ or smaller and preferably 44$\mu$ or smaller in particle size. Especially in the manufacture of a product which is required to have electrical conductivity, the use of a filler having a 5-$\mu$ particle size, even in small amounts, will attain remarkable effects.

The use, as the inorganic filler, of powdered graphite, molybdenum disulfide, tungsten disulfide, boron nitride, lead dioxide, trilead tetraoxide, or fibrous carbon or graphite whisker, or the use, as the organic filler, of a particulate or fibrous ethylene tetrafluoride polymer or ethylene trifluoride polymer will provide the resulting product with especially reduced frictional, self-lubricant and wear-resistant properties. It is desirable to use at least 0.5 parts by weight and preferably up to 1000 parts in amount to provide such properties. As far as a uniform dispersion of the filler or fillers is possible in this case, the size thereof is unnecessary to limit.

The use of particulate fillers such as powdered silicon dioxide, graphite, aluminum silicate, aluminum oxide, silicon carbide, barium titanate, titanium oxide and mica, the use of fibrous fillers such as asbestos, glass and carbon fibers, or the use of whiskers, such as potassium titanate, silicon carbide, aluminum oxide, graphite and tungsten whiskers, will give an improved modulus of elasticity, decreased thermal expansibility, and improved dimensional stability during molding and machining, and the resulting product will be characterized by good high-temperature structural stability. The amounts of said fillers usable for this purpose should be at least 5 parts by weight and preferably not more than 2000 parts by weight.

The use of particulate fillers such as ferric and ferrous oxides, barium and manganese ferrites, and the like, will produce a magnetic product which is characterized by excellent moldability and workability (or processability). Fillers suitable for this purpose should preferably be used in amounts of 100 – 9000 parts by weight per 100 parts by weight of copolymer matrix.

In addition, the use, as the particulate inorganic fillers, of aluminum oxide (corundum, alundum or the like), silicon carbide, diamond, ferric oxide ($\alpha$-Fe$_2$O) and glass particles will produce an abrasive which is characterized by excellent moldability and workability as well as excellent wear resistance.

The fillers may be mixed with the metal-containing, organic high molecular compound before shaping thereof by use of a ball mill, V-type blender, or the like. They may also be mixed with the metal-containing copolymer by dispersing or suspension dispersing the former in a solvent wherein the copolymer matrix and the metallic compound to be coordination bonded thereto are dissolved, or in a solution of this metallic compound wherein the copolymer matrix is suspended and dispersed.

It has been found that it is especially difficult to uniformly disperse a fine fibrous filler, such as asbestos fibers, into the copolymer. However, a filler-reinforced, metal-containing copolymer may be obtained by mixing an emulsion of the emulsion polymerized copolymer matrix, in water or a polar solvent, with a dispersion of the fine inorganic filler, such as asbestos fibers, together with a metal salt, such as aluminum chloride, aluminum formate, stannic chloride or zirconium chloride, in water or a polar solvent, thereby coprecipitating the inorganic filler and the copolymer particles adsorbed thereto. In this manner, a copolymer having a fine inorganic fiber uniformly dispersed therein may be obtained. This copolymer may then be reacted with the metallic compound to obtain the desired filler-reinforced, metal-containing, organic high molecular compound in which the filler is uniformly dispersed.

Having now generally described the invention, a further understanding can be obtained by reference to certain specific Examples which are provided herein for purposes of illustration only and are not intended to be limiting in any manner unless otherwise specified.

EXAMPLE 1

A flask provided with a stirrer, cooler, thermometer and inlet for nitrogen, was charged with 85 parts by weight of acrylonitrile, 15 parts by weight of acrylic acid, 334 parts by weight of methanol silica sol (the silica being 10 – 20 m$\mu$ in particle size and contained in the amount of 100 parts by weight in the sol, and the sol being supplied by Nissan Kagaku Co., Lfd.), Ltd.), 3.3 parts by weight of a silane type coupling agent (supplied under the trademark of KBM 503 by Shin-etsu Kagaku Co., Ltd.) and 400 parts by weight of an aqueous solution acidified with sulphuric acid to a pH of 3.0. The resulting mixture was kept at 30°C under agitation and then incorporated with 100 parts by weight of a sulphuric acid-acidified aqueous solution (pH = 0.3) in which were dissolved 0.5 parts by weight of each of potassium persulphate as an initiator and sodium bisulphite, thereby commensing the precipitation of a white-colored product and completing the polymerization in three hours. The white-colored product was filtered off, washed and dried at 75°C under reduced pressure for 24 hours thereby to obtain a white-colored high molecular compound containing silicon dioxide (Yield of the compound, 197 parts by weight; Content of the silicon dioxide, 50.1% by weight as determined from ash-metry). One hundred and sixty parts by weight of the thus-obtained copolymer containing silicon dioxide and 23.7 parts by weight of copper borate (this borate containing 42.8% by weight of copper and being prepared by baking the copper borate produced by Ishizu Pharmaceutical Co., Ltd., at a temperature of 400°C for two hours) were mixed together for 16 hours on a ball mill, after which the mixture was then compression molded at 200 kg/cm$^2$ and 200°C for 15 minutes thereby to obtain plate-like moldings containing one metal ion per eight nitrile groups and having a brown-colored, smooth and attractive surface.

The moldings so obtained were tested for heat distortion temperature, tensile strength, impact strength (without notch) and flexural strength and flexural modulus in accordance with ASTM D 648, ASTM D 638, ASTM D 256 and ASTM D 790, respectively. The thermal and mechanical properties so found are as follows:

| | | |
|---|---|---|
| Heat distortion temperature (°C) | | 270 |
| Tensile Strength | (kg/cm$^2$) | 1,240 |
| Impact Strength | (kg-cm/cm$^2$) | 4.2 |
| Flexural Strength | (kg/cm$^2$) | 1,370 |
| Flexural Modulus | (kg/cm$^2$) | 170,000 |

EXAMPLE 2

A flask provided with a stirrer, cooler, thermometer and inlet for nitrogen was charged with, by weight, 200 parts of a deionized water, 70 parts of acrylonitrile, 30 parts of methyl acrylate, 0.4 parts of ethyl mercaptan, as a chain transfer agent, and 2.0 parts of Pelex-OTP (composed of sodium dialkylsulfosuccinate and supplied by Kaoh Atlas Co., Ltd.) were kept at 70°C under agitation. The mixture was then treated with 0.1 part of potassium persulfate as an initiator and agitated for an additional 90 minutes to yield a white-turbid emulsion of acrylonitrilemethyl acrylate copolymer. Separately, 42.0 parts by weight of chrysotile asbestos fibers, a filler for resinous material (the fibers being supplied by Nippon Asbestos Co., Ltd.) were introduced into 8,000 parts by weight of a deionized water, agitated and dispersed by a homogenizing mixer rotating at about 8,000 r.p.m., and incorporated with 2.6 parts by weight of anhydrous aluminum chloride as a dispersant. It was allowed to stand for 12 hours. The copolymer emulsion and the asbestos fibers dispersion each were mutually mixed, agitated and then allowed to stand for 8 hours to obtain a precipitate which was then dried at 70°C for 24 hours. An acrylonitrile-methyl acrylate copolymer (containing methyl acrylate in an amount of 30% by weight of the original, fiber-free copolymer) was obtained, wherein the asbestos fibers were uniformly dispersed in an amount of 30% by weight of the fiber-containing copolymer.

14.3 parts by weight of the fiber-containing copolymer thus obtained were suspended and dispersed in a solution of 11.3 parts by weight of copper nitrate and 0.82 parts by weight of hydroxylamine hydrochloride in 200 parts by weight of a deionized water. The suspension so produced was agitated at 95°C. for 180 minutes, filtered, washed and dried to a light-brown material wherein the copper ions and the nitrile groups of the copolymer were present in a molar ratio of 1 : 16.9.

This material was compression molded at 200°C. and 500 Kg/cm$^2$ for 7 minutes to obtain brown moldings, in the plate form, having a smooth surface.

These moldings were tested for their thermal and mechanical properties in the same manner as in Example 1 with the results being as follows:

| | |
|---|---|
| Heat distortion temp. (°C.) | 196 |
| Tensile strength (Kg/cm$^2$) | 1070 |
| Impact strength (Kg-cm/cm$^2$) | 16.9 |
| Flexural strength (Kg/cm$^2$) | 1440 |

EXAMPLE 3

An asbestos fiber-containing acrylonitrile-methacrylic acid copolymer in dry state (containing methacrylic acid in an amount of 30% by weight of the original, fiber-free copolymer) wherein asbestos fibers were contained in an amount of 30% by weight of the fiber-containing copolymer, was prepared. This copolymer was prepared as in Example 2, and 18.5 parts by weight of copper borate containing 42.8% by weight of copper, was admixed therewith in a ball mill for 16 hours to form a mixture which was then compression molded at 200°C. and 500 Kg/cm$^2$ for 30 minutes thereby obtaining brown plate-like moldings having a smooth surface. When tested in the same manner as in Example 1, the moldings exhibited the following thermal and mechanical properties:

| | |
|---|---|
| Heat distortion temp. (°C.) | 202 |
| Impact strength (kg-cm/cm$^2$) | 14.0 |
| Flexural strength (Kg/cm$^2$) | 1590 |

EXAMPLE 4

Four hundred parts by weight of a degased deionized water, 85 parts by weight of acrylonitrile and 15 parts by weight of acrylic acid were introduced into a flask provided with a stirrer, cooler, thermometer and inlet for nitrogen and kept at a temperature of 40°C. while stirring. The resulting mixture was then treated with a solution of 0.3 parts by weight of potassium persulfate in 10 parts of a deionized water and, one minute thereafter, with a solution of 0.15 parts by weight of sodium bisulfite in 10 parts by weight of deionized water to begin precipitation of a white product. Polymerization was completed three hours after the beginning of the precipitation. The white product so obtained was filtered off and dried at 60°C. under reduced pressure for 24 hours to obtain a yield of 98% by weight of an acrylonitrile-acrylic acid copolymer having a $\eta$ sp of 0.45 as determined (25°C., 0.1% concentration) using dimethylformamide (hereinafter referred to as "DMF").

66.4 parts by weight of the copolymer thus obtained and 18.5 parts by weight of copper borate (this borate containing 42.8% by weight of copper and being prepared by firing a starting copper borate at 400°C. for two hours) were blended together in a ball mill for 16 hours.

Samples of the thus-prepared mixture were respectively blended with fillers, powdered copper (powdered electrolytic copper CE20 supplied by Fukuda Metallic Foil and Powder Co., Ltd.), powdered aluminum (powdered sprayed aluminum AL-AT-150 supplied by the same company as above), powdered iron (powdered electrolytic iron Fe-(E)-150 supplied by the same company as above), powdered graphite and powdered silicon carbide having a 300-mesh size) by use of a ball mill for 16 hours. The filler-blended samples were compression molded at 150°C. and 800 Kg/cm² for 5 minutes and then thermally treated at 190°C. in an atmosphere of nitrogen for 20 minutes. The plate-like moldings were subjected to the same test as in Example 1 and were found to have the thermal and mechanical properties shown in Table 3.

chloride (anhydride) and 27.8 parts by weight of hydroxylamine hydrochloride and then dissolved under agitation to form a solution thereof which was further agitated at 50°C. for 60 minutes. The solution was filtered, washed and dried at 30°C. and a reduced pressure of $10^{-2}$ mmHg for 48 hours to obtain a metal-containing copolymer wherein the copper ions and the nitrile groups of the copolymer were contained in a molar ratio of 1 : 7.4. A part of the metal-containing copolymer was incorporated with powdered gun metal (supplied under the trade name CLT-At-325 by Fukuda Metallic Foil Co., Ltd., Japan) as shown in Table 4, mixed together on a mill for 4 hours, compression molded at 700 Kg/cm² and 220°C. for 20 minutes to form plate-like moldings thereof and then tested for heat distortion temperature, heat conductivity (using an apparatus for measuring heat conductivity supplied under trade name SSTC-18B by Shibayama Chemical Co., Ltd.), flexural strength and impact strength. The results are shown in Table 4.

The rest of said metal-containing copolymer was compression molded at 1000 Kg/cm² and 190°C. for 5 minutes into cylindrical moldings which where then heat treated in a silicone oil at 210°C. for 30 minutes and thereafter machined to obtain cylinders having an inner diameter of 20.0 mm, an outer diameter of 25.6 mm and a height of 15.0 mm. The cylinders so obtained were tested, in comparison with those prepared from carburized steel (SH-50) in the same manner as above for frictional coefficient and frictional weight loss (using an apparatus for friction and wear loss, supplied under the trade name EMF IIB-type by Toyo Baldwin Co., Ltd.). The results are shown in Table 4 The frictional coefficients were obtained under the conditions of a load of 10 Kg/cm², a velocity of 30 cm/sec and an odometrically measured distance of 1 Km, and the frictional weight loss obtained under the conditions of a load of 10 Kg/cm², a velocity of 30 cm/sec and an odometrically measured distance of 500 Km.

As is seen from Table 4, the use of powdered gun metal in amounts of 20 parts by weight or more gave the products which were remarkably improved in heat conductivity and wear resistance, while the use thereof Table 3

(Example 4)

| Filler | Powdered aluminum | Powdered copper | Powdered iron | Powdered graphite | Powdered silicon carbide |
|---|---|---|---|---|---|
| Amount of filler added (part by weight) (based on 66.4 parts by weight of copolymer) | 76.3 | 252 | 222 | 63.5 | 90.0 |
| Heat distortion temp. (°C.) | 290 | 293 | 289 | 270 | 274 |
| Impact strength (Kg-cm/cm²) | 5.3 | 6.7 | 3.1 | 3.3 | 2.0 |
| Flexural strength (Kg/cm²) | 1,500 | 1,480 | 1,210 | 1,100 | 830 |
| Flexural modulus | 86,000 | 92,000 | 150,000 | 140,000 | 170,000 |

EXAMPLE 5

One hundred parts by weight of an acrylonitrile-methacrylic acid-methyl acrylate copolymer (including methacrylic acid 10 wt. %, methyl acrylate 10 wt. %) prepared in the same manner as in Example 4 were suspended and dispersed in 1000 parts by weight of a degased deionized water. The suspension thus obtained was incorporated with 68.3 parts by weight of cupric in amounts of more than 9000 parts by weight gave the product having remarkably decreased strengths. In addition, when the cylindrical moldings made from the filler (powdered gun metal)-free, metal-containing copolymer were heat treated in a silicone oil in the same manner as above in an attempt to obtain therefrom test pieces for frictional test, they remarkably deformed themselves and created pores in the inner part thereof, thereby making it impossible to prepare the test pieces.

Thus, only in this case, the filler-free, metal-containing copolymer was compression molded at a pressure of 1000 Kg/cm$^2$ and a temperature of 180°C. for 60 minutes to prepare test pieces for frictional test.

As is seen from the foregoing, the filler-reinforced, metal-containing copolymer in which is present a highly heat-conductive filler such as powdered gun metal, will permit a wide selection of heating conditions under which a coordination bond-forming reaction takes place therein as compared with that in which such a filler is not present.

EXAMPLE 6

Samples of the same metal-containing copolymer as used in Example 5 were incorporated with powdered zinc (supplied under the trade name ZnAt-325 by Fukuda Metallic Foil Co., Ltd., Japan), powdered nickel (Ni- 325), spary powdered stainless steel (St.At-100,SUS 32), spray powdered bronze (Bro-At-W-325), spray powdered brass (Bra-At-325), powdered tin (Sn-S-200) and spray powdered lead (Pb-At-325) (these powdered metals being supplied by Fukuda Metallic Foil Co., Ltd.), respectively, as shown in Table 5. Each sample and the powdered metal incorporated therin were mixed together on a ball mill for 4 hours. A part of each mixture so obtained was compression molded at 500 Kg/cm$^2$ and 200°C. for 20 minutes into plate-like moldings, and the rest of each mixture was compression molded at 800 Kg/cm$^2$ and 190°C. for 30 minutes into cylindrical moldings which were then treated in the same manner as in Example 5 to obtain test pieces thereof. The plate-like moldings and the cylindrical test pieces were respectively tested as shown in Example 5 and the results are indicated in Table 5.

EXAMPLE 7

Samples of a metal-containing, acrylonitrile-methacrylic acid-methyl acrylate copolymer (including, by weight, 10% of methacrylic acid and 5% of methyl acrylate) wherein the copper ion and the nitrile groups of the copolymer were contained in a molar ratio of 1: 10.1, the metal containing copolymer being prepared in the same manner as in Example 5, were respectively incorporated with molybdenum disulphide (supplied under the trade name B Powder by Nippon Molybdenum Co., Ltd., Japan), boron nitride (supplied under the trade name Shyo-B-N Powder HPS by Showa Denko Co., Ltd., Japan), powdered lead dioxide (supplied by Nakarai Chemical Co., Ltd.), powdered ethylene tetrafluoride polymer (supplied under the trade name Polyflon M-12 by Daikin Co., Ltd., Japan) and powdered ethylene trifluoride polymer supplied under the trade name Diflon M-300 by Daikin Co., Ltd.) as shown in Table 6 to obtain samples of filler-reinforced, metal-containing copolymer. The samples so obtained were then treated under the same conditions as in Example 5 to obtain moldings thereof which were tested for thermal and mechanical properties. The properties thus obtained are indicated in Table 6.

EXAMPLE 8

A metal-containing, acrylonitrile-methacrylic acid-methyl acrylate copolymer (including 10% by weight of methacrylic acid and 20% by weight of methyl acrylate) wherein the copper ion and the nitrile groups of the copolymer were contained in a molar ratio of 1 : 5.8, the metal-containing copolymer being prepared as shown in Example 5, was mixed with electrically conductive silver powder (supplied under trade name AgC-A by Fukuda Metallic Foil Co., Ltd.) in the amount of 50 parts by weight per 100 parts by weight of copolymer on a ball mill for 4 hours. The mixture so obtained was compression molded into plate-like moldings at 500 Kg/cm$^2$ and 200°C. for 20 minutes and then tested with the result that it had a flexural strength of 2680 Kg/cm$^2$, impact strength of 28.1 Kg-cm/cm$^2$, a heat distortion temperature of 198°C. and a volume resistance of 10$^{-3}$Ωcm.

EXAMPLE 9

One thousand parts by weight of powdered barium ferrite (supplied under the trade name BF-A by Toda Kogyo Co., Ltd., Japan) were mixed with 100 parts by weight of the same copolymer containing the copper ion as used in Example 7 on a ball mill for 4 hours. The thus-obtained mixture was then subjected to compression molding at 2000 Kg/cm$^2$ and 200°C. for 30 minutes to obtain secure ferrite moldings which can be magnetized for use as a general magnetic material.

EXAMPLE 10

Samples of a metal-containing, acrylonitrile-methacrylic acid-methyl acrylate (including, by weight, 10% of methacrylic acid and 5% of methyl acrylate) wherein the copper ion and the nitrile groups of the copolymer were contained in a molar ratio of 1 : 4.2, the metal-containing copolymer being prepared in the same manner as in Example 5, were incorporated with potassium titanate whisker (supplied under the trade name Fybex by Du Pont, Inc.), silicon carbide whisker (supplied under the trade name S-M$_1$ by Suwa Seiki Co., Ltd.), 3 mm-cut carbon fibers (supplied under the trade name Grafil by Courtaulds Co., Ltd.) and glass fibers (supplied under the trade name CSPE 402 by Nitto Boseki Co., Ltd.), respectively, as indicated in Table 7. Each filler-incorporated sample so obtained was mixed together using a V-type blender for 30 minutes and then molded at 235°C. and 800 Kg/cm$^2$ for 30 minutes to obtain plate-like moldings which were then tested for thermal and mechanical properties. The results are given in Table 7 which shows that the filler-reinforced, metal-containing copolymers of this invention are the ones in which even the fibrous filler is also uniformly dispersed in the metal-containing copolymer and have excellent properties.

EXAMPLE 11

One hundred parts by weight of the same copolymer in the powder form as used in Example 4 were added to a solution of 43.8 parts by weight of zinc acetate [(CH$_3$CO$_2$)$_2$Zn.2H$_2$O] in 1000 parts by weight of dimethylformamide, vigorously agitated to suspend the copolymer in a slurry form in the solution and then heated to 70°C. to thoroughly dissolve it therein. The copolymer solution thus obtained was incorporated with 100 parts by weight of 3 mm-cut glass fibers of diameter 10μ (supplied under the trade name CS3PE by Nitto Boseki Co., Ltd.) and kneaded together to form a mixture thereof which was then dried at 70°C. and under a reduced pressure for 96 hours to obtain a solid residue therefrom. The residue so obtained was pulverized and compression molded at 1000 Kg/cm$^2$ into plate-like moldings while heatng to 180°C. for 30 minutes and then to 200°C. for 30 minutes. The plate-like moldings were tested and found to have a flexural strength of 1820 Kg/cm$^2$, impact strength of 19.9 Kg-cm/cm² and heat distortion temperature of 197°C.

EXAMPLE 12

One hundred parts by weight of the same copolymer in the powder form as used in Example 4 were added to a solution of 49.7 parts by weight of nickel acetate [$(CH_3CO_2)_2Ni.4H_2O$] in 1000 parts by weight of dimethylformamide, vigorously agitated to make a slurry-like suspension thereof and then heated to 70°C. to form a solution thereof. The solution so formed was incorporated with 80 parts by weight of 3 mm-cut carbon fibers (Grafil A, Courtaulds Co., Ltd.) and then kneaded together to form a mixture thereof. The thus-formed mixture was dried at 70°C. under a reduced pressure for 96 hours to obtain a solid residue which was then compression molded under 1000 Kg/cm² while heating to 180°C. for 30 minutes and then to 200°C. for 30 minutes, into plate-like moldings. The plate-like moldings so obtained were tested and found to be 1740 Kg/cm², 15.0 Kg-cm/cm² and 186°C. in flexural strength, impact strength and heat distortion temperture, respectively.

EXAMPLE 13

One hundred parts by weight of the same metal-containing copolymer (in which the copper ion and the nitrile groups of the copolymer were contained in a molar ratio of 1 : 7.4) as used in Example 5, were incorporated with 800 parts by weight of aluminum oxide (brown-colored, fused alumina 4A, particle size No. 80) or silicon carbide (green-colored silicon carbide First grade 4C, particle size No. 120) and further with 300 parts by weight of water and then kneaded together to form a mixture thereof. The mixture so formed was dried at 70°C. for 16 hours. The solid residue thus obtained was slighttly pulverized and then compression molded at 4000 Kg/cm² and at 200°C. for 60 minutes thereby giving disc-like moldings of 16-mm thickness and 50-mm diameter. The disc-like moldings so obtained, regardless of the used filler being aluminum oxide or silicon carbide, may be used as a resinoid grinder, are not thermally softened and allow various cooling agents to be used therewith, and they are thus especially suitable for use as a cutting grinder and a precisely finishing grinder.

In addition, in the manufacture of grinding stones made of the filler-reinforced, metal-containing copolymers and their moldings of this invention, the kinds and particle sizes of fillers used may be widely varied depending upon materials to be worked (or ground) or a desired accuracy of working (or grinding).

Table 4

| | | | | | | | |
|---|---|---|---|---|---|---|---|
| Amount of powdered gun metal used (parts by weight per 100 parts by weight of copolymer) | 0 | 20 | 100 | 1000 | 5000 | 9000 | 15000 |
| Heat distortion temperature (°C) | 189 | 208 | 222 | 259 | 251 | 241 | 220 |
| Heat conductivity (cal.cm$^{-1}$.sec$^{-1}$.deg.$^{-1}$) | $6\times10^{-4}$ | $1\times10^{-3}$ | $3\times10^{-3}$ | $9\times10^{-3}$ | $9\times10^{-3}$ | $1\times10^{-2}$ | $2\times10^{-2}$ |
| Flexural strength (Kg/cm²) | 2550 | 2610 | 2510 | 2000 | 1270 | 730 | 310 |
| Impact strength (Kg-cm/cm²) | 21.3 | 25.1 | 14.0 | 6.6 | 3.0 | 1.9 | 0.3 |
| Coefficient of friction | 0.25 | 0.27 | 0.32 | 0.33 | 0.33 | 0.37 | 0.39 |
| Frictional weight loss (wt.%) | 18.4 | 5.6 | 3.2 | 2.1 | 1.0 | 0.9 | 0.7 |
| Remarks | (Comparison example) | Example | Example | Example | Example | Example | (Comparison example) |

Table 5

| Filler | Zinc | Nickel | Stainless steel | Bronze | Brass | Tin | Lead |
|---|---|---|---|---|---|---|---|
| Amount of filler used (Parts by weight per 100 parts by weight of copolymer) | 2000 | 800 | 800 | 1000 | 1000 | 2000 | 2000 |
| Heat distortion temp. (°C) | 220 | 249 | 253 | 253 | 256 | 188 | 192 |
| Heat conductivity (cal-cm$^{-1}$.sec$^{-1}$.deg.$^{-1}$) | $3\times10^{-3}$ | $2\times10^{-3}$ | $9\times10^{-4}$ | $4\times10^{-3}$ | $4\times10^{-3}$ | $6\times10^{-3}$ | $2\times10^{-3}$ |
| Flexural strength (kg/cm²) | 1590 | 2020 | 2100 | 2200 | 2360 | 1420 | 1530 |
| Impact strength (Kg-cm/cm²) | 5.5 | 7.0 | 8.3 | 9.1 | 9.6 | 4.3 | 4.8 |
| Coefficient of friction | 0.35 | 0.37 | 0.37 | 0.33 | 0.31 | 0.29 | 0.26 |
| Frictional weight loss (wt.%) | 3.9 | 2.5 | 3.7 | 2.1 | 1.9 | 4.7 | 3.8 |

Table 6

| Filler | Molybdenum disulphide | Boron nitride | Lead dioxide | Ethylene trifluoride polymer | Ethylene tetrafluoride polymer |
|---|---|---|---|---|---|
| Amount of filler used (parts by weight per 100 parts by weight of copolymer) | 10 | 10 | 30 | 10 | 10 |
| Heat distortion temp. (°C) | 186 | 191 | 199 | 180 | 181 |

Table 6-continued

| Filler | Molybdenum disulphide | Boron nitride | Lead dioxide | Ethylene trifluoride polymer | Ethylene tetrafluoride polymer |
|---|---|---|---|---|---|
| Flexural strength (Kg/cm²) | 2200 | 2380 | 2010 | 1840 | 1910 |
| Impact strength (Kg-cm/cm²) | 18.5 | 19.1 | 18.6 | 12.1 | 12.6 |
| Coefficient of friction | 0.25 | 0.20 | 0.26 | 0.19 | 0.21 |
| Frictional weight loss (wt.%) | 6.7 | 5.5 | 6.1 | 8.9 | 10.1 |

Table 7

| Filler | Potassium titanate whisker | | Carbon fiber | | Glass Fiber | | Silicon carbide | |
|---|---|---|---|---|---|---|---|---|
| Amount of filler used (parts by weight per 100 parts by weight of copolymer) | 10 | 30 | 10 | 30 | 10 | 30 | 10 | 30 |
| Heat distortion temp. (°C) | 264 | 269 | 259 | 267 | 244 | 261 | 261 | 269 |
| Flexural strength (Kg/cm²) | 2120 | 2300 | 2640 | 2710 | 2320 | 2300 | 1680 | 1620 |
| Impact strength (Kg-cm/cm²) | 9.1 | 7.4 | 27.1 | 26.6 | 21.0 | 23.4 | 7.7 | 6.9 |

Having now fully described the invention, it will be apparent to one of ordinary skill in the art that many changes and modifications can be made thereto without departing from the spirit or scope of the invention.

ACCORDINGLY, What is claimed as new and desired to be secured by letters patent is:

1. A filler-reinforced, metal-containing, organic high molecular compound which comprises: (1) 100 parts by weight of a copolymer of 45 – 97% by weight of at least one member selected from the group consisting of acrylonitrile and methacrylonitrile, with 55 – 3% by weight of at least one member selected from the group consisting of unsaturated carboxylic ester, unsaturated carboxylic acid and unsaturated carboxylic amide each of which is copolymerizable with acrylonitrile or methacrylonitrile, which copolymer is stabilized through cross-linking with at least one metallic compound of a transition metal of the 4th Period of the Periodic Table, a metal of Group II of the Periodic Table or a mixture thereof, said metal in ion or salt form being coordination bonded with the nitrile groups of the copolymer in molar ratios of from 1 : 32 to 32 : 32, and (2) 0.5 – 9000 parts by weight of at least one inorganic or organic filler dispersed in the metal-containing, organic high molecular compound.

2. The filler-reinforced, metal-containing, organic high molecular compound according to claim 1, wherein the unsaturated carboxylic compound is selected from the group consisting of methyl, ethyl, n-butyl and isobutyl esters of acrylic, methacrylic, itaconic and maleic acids; acrylic, methacrylic, itaconic and maleic acids; and acrylic, methacrylic, diacetoneacrylic, n-methylol and n-methylol-methacrylic amides.

3. The filler-reinforced, metal-containing, organic high molecular compound according to claim 1, wherein the metallic compound is a compound of iron, cobalt, nickel, chromium, manganese, copper, or zinc.

4. The filler-reinforced, metal-containing, organic high molecular compound according to claim 1, wherein the inorganic filler is selected from the group consisting of particulate aluminum, copper and copper-based alloys, iron, stainless steel, tin, zinc, nickel, silver, lead, graphite, diamond, silicon dioxide, aluminum silicate, silicon carbide, tungsten carbide, aluminum oxide, molybdenum disulphide, tungsten disulphide, boron nitride, ferric oxide, ferrous oxide, barium ferrite, manganese ferrite, lead dioxide, trilead tetraoxide, barium titanate, titanium oxide, mica and glass.

5. The filler-reinforced, metal-containing, organic high molecular compound according to claim 1, wherein the inorganic filler is selected from the group consisting of fibrous asbestos, glass, silica, carbon, stainless steel, copper, and potassium titanate, silicon carbide, aluminum oxide and graphite whiskers.

6. The filler-reinforced, metal-containing, organic high molecular compound according to claim 1, wherein the organic filler is selected from the group consisting of particulate and fibrous ethylene tetrafluoride and ethylene trifluoride polymers.

7. A process for the production of a filler-reinforced, metal-containing, organic high molecular compound, characterized by reacting, at 40° – 250°C. and in the presence of 0.5 – 9000 parts by weight of at least one of inorganic and organic filler, (1) 100 parts by weight of a copolymer of 45 – 97% by weight of at least one member selected from the group consisting of acrylonitrile and methacrylonitrile, with 55 – 3% by weight of at least one member selected from the group consisting of unsaturated carboxylic ester, unsaturated carboxylic acid and unsaturated carboxylic amide which are each copolymerizable with acrylonitrile or methacrylonitrile, with (2) at least one metallic compound of a transition metal of the 4th Period of the Periodic Table, a metal of Group II of the Periodic Table and the mixtures thereof, in such amounts that the metal in ion or salt form is coordination bonded with the nitrile groups of the copolymer in molar ratios of from 1 : 32 to 32 : 32 thereby stabilizing said copolymer through cross-linking.

8. The process according to claim 7, wherein the copolymer is prepared by (1) dispersing or dissolving at least one member selected from the group consisting of acrylonitrile and methacrylonitrile and an unsaturated carboxylic compound, and admixing with at least one inorganic or organic filler in water or a polar solvent and then (2) copolymerizing said monomers in the presence of a free-radical polymerization initiator.

* * * * *